(12) United States Patent
Matsuzaki et al.

(10) Patent No.: US 12,060,022 B2
(45) Date of Patent: Aug. 13, 2024

(54) OCCUPANT PROTECTION DEVICE (71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Takuya Kusumura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/361,347

(22) Filed: Jul. 28, 2023

(65) Prior Publication Data

US 2024/0059240 A1 Feb. 22, 2024

(30) Foreign Application Priority Data

Aug. 17, 2022 (JP) .................. 2022-130293

(51) Int. Cl.
| | |
|---|---|
| *B60R 21/18* | (2006.01) |
| *B60R 21/207* | (2006.01) |
| *B60R 21/231* | (2011.01) |
| *B60R 21/233* | (2006.01) |
| *B60R 21/237* | (2006.01) |

(52) U.S. Cl.
CPC ............ *B60R 21/18* (2013.01); *B60R 21/207* (2013.01); *B60R 21/231* (2013.01); *B60R 21/233* (2013.01); *B60R 21/237* (2013.01); *B60R 2021/23308* (2013.01)

(58) Field of Classification Search
CPC ..... B60R 21/18; B60R 21/231; B60R 21/207; B60R 21/233; B60R 2021/0044; B60R 2021/23308

USPC ..................... 280/733, 743.1, 729
See application file for complete search history.

(56) References Cited

U.S. PATENT DOCUMENTS

| | | | |
|---|---|---|---|
| 6,286,860 B1 * | 9/2001 | Adomeit ................. | B60R 21/18 280/733 |
| 6,293,582 B1 * | 9/2001 | Lewis ..................... | B60R 22/14 280/735 |
| 6,378,898 B1 * | 4/2002 | Lewis ..................... | B60R 21/18 280/739 |
| 8,585,084 B1 * | 11/2013 | Schneider ............... | B60R 21/18 280/743.2 |
| 9,925,950 B2 * | 3/2018 | Moeller .................. | B60R 21/239 |
| 10,144,381 B2 * | 12/2018 | Faruque .................. | B60R 22/46 |
| 2006/0119085 A1 * | 6/2006 | Masuda .................. | B60R 21/18 280/733 |

(Continued)

FOREIGN PATENT DOCUMENTS

| | | | | |
|---|---|---|---|---|
| DE | 102018123209 A1 * | 3/2020 | ........... | B60R 21/013 |
| JP | 2020-66425 A | 4/2020 | | |

*Primary Examiner* — Keith J Frisby
(74) *Attorney, Agent, or Firm* — Posz Law Group, PLC (57) ABSTRACT

An occupant protection device for protecting an occupant seated in a seat includes a seatbelt having at least a tongue, a buckle, and a lap belt portion, an inflator, and an airbag provided in the lap belt portion. In a state where a main body portion of the airbag is inflated, an end portion on a tongue side of a conduit portion of the airbag in a left-right direction of the seat extends as far as a position equivalent to that of an end portion on the tongue side of the main body portion, or nearer than the end portion on the tongue side of the main body portion to the tongue.

5 Claims, 10 Drawing Sheets

(56) References Cited

U.S. PATENT DOCUMENTS

| | | | |
|---|---|---|---|
| 2009/0278340 A1* | 11/2009 | Azuma | B60R 21/0134 |
| | | | 280/733 |
| 2013/0264803 A1* | 10/2013 | Schneider | B60R 21/18 |
| | | | 280/733 |
| 2017/0225788 A1* | 8/2017 | Humbert | B60R 21/233 |
| 2017/0282832 A1* | 10/2017 | Kondo | B60R 21/01548 |
| 2019/0299899 A1* | 10/2019 | Einarsson | B60R 21/233 |
| 2020/0122668 A1 | 4/2020 | Ozaki et al. | |
| 2021/0094496 A1* | 4/2021 | Tanaka | B60R 21/20 |
| 2021/0094504 A1* | 4/2021 | Tanaka | B60R 21/2338 |
| 2021/0300277 A1* | 9/2021 | Fukaura | B60R 21/18 |
| 2021/0300278 A1* | 9/2021 | Hayashi | B60R 21/18 |
| 2021/0300292 A1* | 9/2021 | Yamada | B60R 21/2338 |
| 2022/0048460 A1* | 2/2022 | Yamada | B60R 21/207 |
| 2022/0306033 A1* | 9/2022 | Fukaura | B60R 21/231 |
| 2023/0103417 A1* | 4/2023 | Matsuzaki | B60R 21/231 |

\* cited by examiner

OCCUPANT PROTECTION DEVICE

The present application claims priority from Japanese Patent Application No. 2022-130293 of Matsuzaki et al., filed on Aug. 17, 2022, the disclosures of which are hereby incorporated into the present application by reference.

BACKGROUND

Technical Field

The present invention relates to an occupant protection device for protecting an occupant seated in a seat.

Description of Related Art

To date, seatbelts have been widely used as a configuration for protecting an occupant seated in a seat. Also, a configuration wherein an airbag is provided in a lap belt portion that restrains a waist portion of an occupant when a seatbelt is worn is disclosed in JP2020-66425A. The airbag disclosed in JP2020-66425A has a main body portion, which receives an occupant by inflating owing to an inflating gas being supplied, and a conduit portion that guides an inflating gas discharged from an inflator to the main body portion.

The conduit portion is such that as it is necessary to cause an upper face and a bottom face to be linked in a leading end portion, which is an end portion on a tongue side in a left-right direction of a seat, a leading end side gradually narrows, and a width in a vertical direction decreases. Herein, the configuration of JP2020-66425A is such that in a state where the main body portion of the airbag is inflated, the leading end portion of the conduit portion is positioned in a position farther from the tongue than a leading end portion that is an end portion on the tongue side of the main body portion in the left-right direction of the seat. This kind of configuration is such that as a narrowing starting point on the leading end side of the conduit portion is liable to be positioned in a region in which the main body portion in an inflated state and the conduit portion are in contact, there is concern that a leading end side of the main body portion will drop downward following a form of the leading end side of the conduit portion, and the main body portion will incline.

SUMMARY

An object of the invention is to provide an occupant protection device such that a leading end side of a main body portion of an airbag inclining downward can be restricted.

A representative configuration of an occupant protection device according to the invention is as follows.

An occupant protection device for protecting an occupant seated in a seat, the occupant protection device comprising:
- a seatbelt having at least a tongue, a buckle to which the tongue is joined, and a lap belt portion that restrains a waist portion of the occupant seated in the seat in a state where the tongue is joined to the buckle;
- an inflator that discharges an inflating gas; and
- an airbag that is provided in the lap belt portion, the airbag including a main body portion, which receives the occupant by inflating owing to the inflating gas being supplied, and a conduit portion, which is connected to the inflator, extends along the lap belt portion, and causes the inflating gas to flow into the main body portion by guiding the inflating gas discharged from the inflator to an inflow port of the main body portion,
wherein an end portion on the tongue side of the conduit portion in a left-right direction of the seat in a state where the main body portion is inflated extends as far as a position equivalent to that of an end portion on the tongue side of the main body portion, or nearer than the end portion on the tongue side of the main body portion to the tongue.

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

First Embodiment

Hereafter, firstly, an overall configuration of an occupant protection device 10 according to a first embodiment of the invention will be described, with reference to the drawings. Dimensions, materials, forms, relative dispositions, and the like of components described hereafter do not limit the scope of the invention, unless specifically stated otherwise. Also, in the following description, left and right directions mean a left direction and a right direction of a seat on which the occupant protection device 10 is mounted, or more specifically, a left direction and a right direction as seen from an occupant M seated on a seat 1. Front and back directions mean a front direction and a back direction of the seat 1 on which the occupant protection device 10 is mounted, or more specifically, a front direction and a back direction as seen from the occupant M seated on the seat 1.

Figure 1:
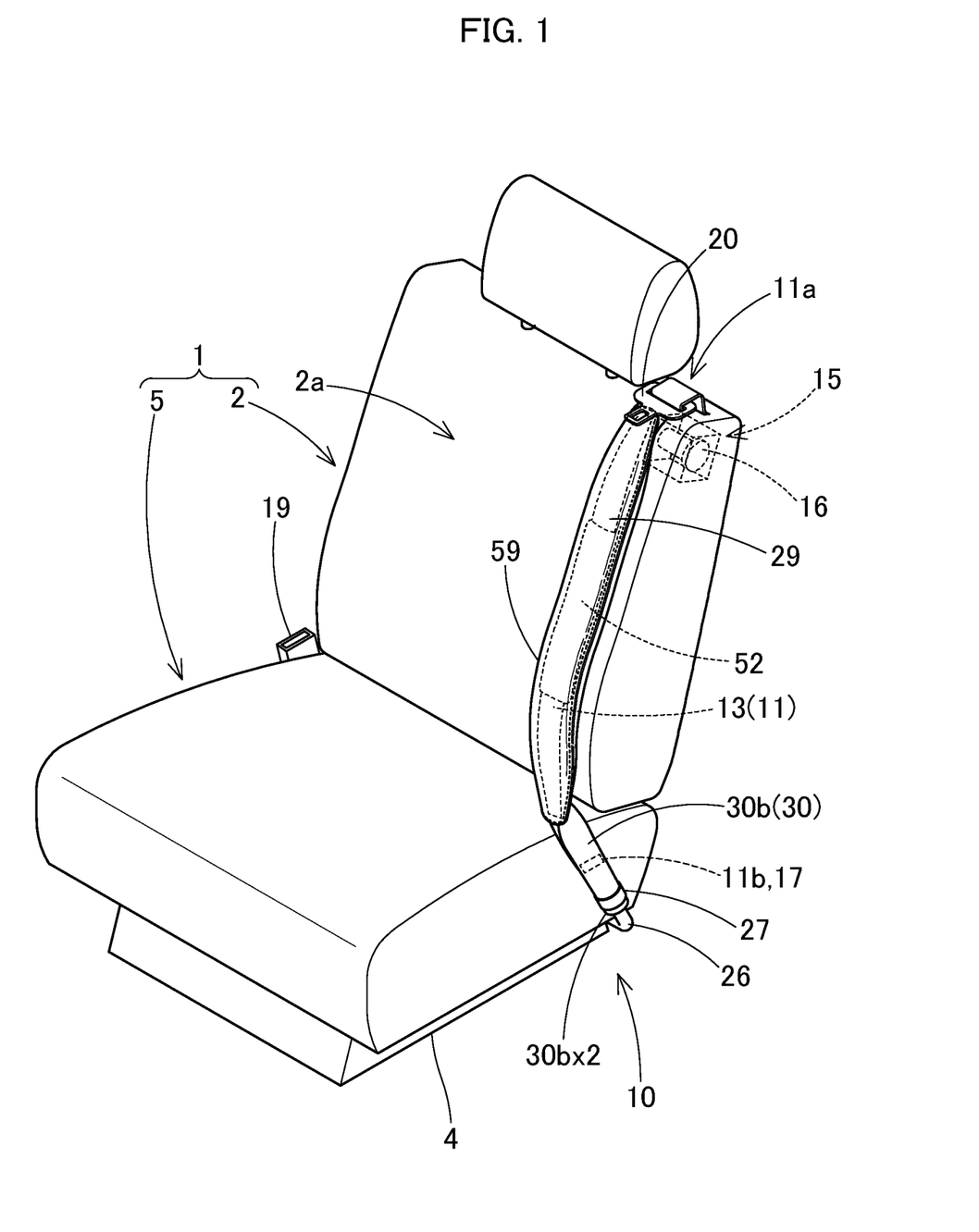
FIG. 1 is a perspective view of a seat on which an occupant protection device according to a first embodiment of the invention is mounted.
Figure 2:
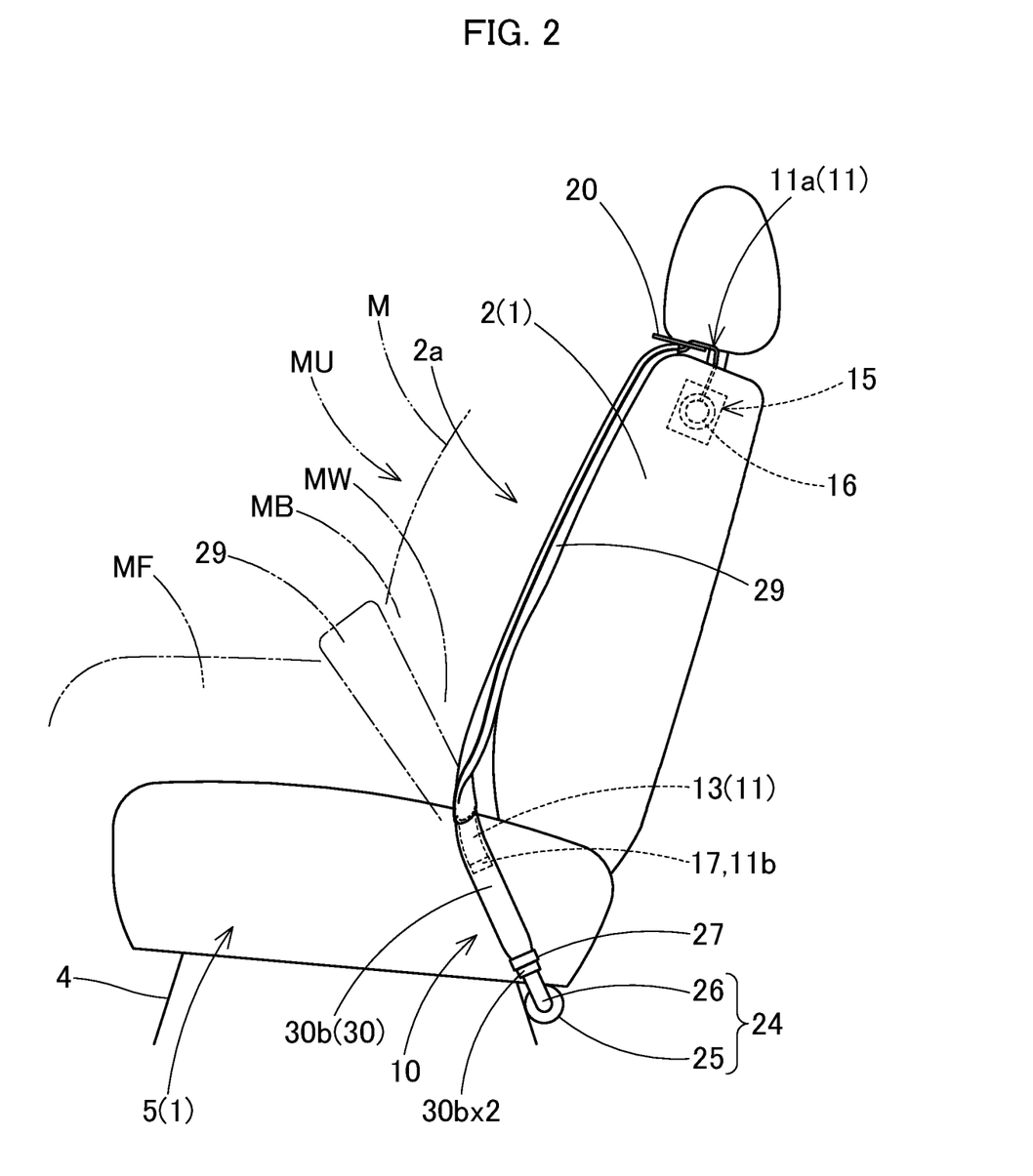
FIG. 2 is a left side view of the seat on which the occupant protection device is mounted.
Figure 3:
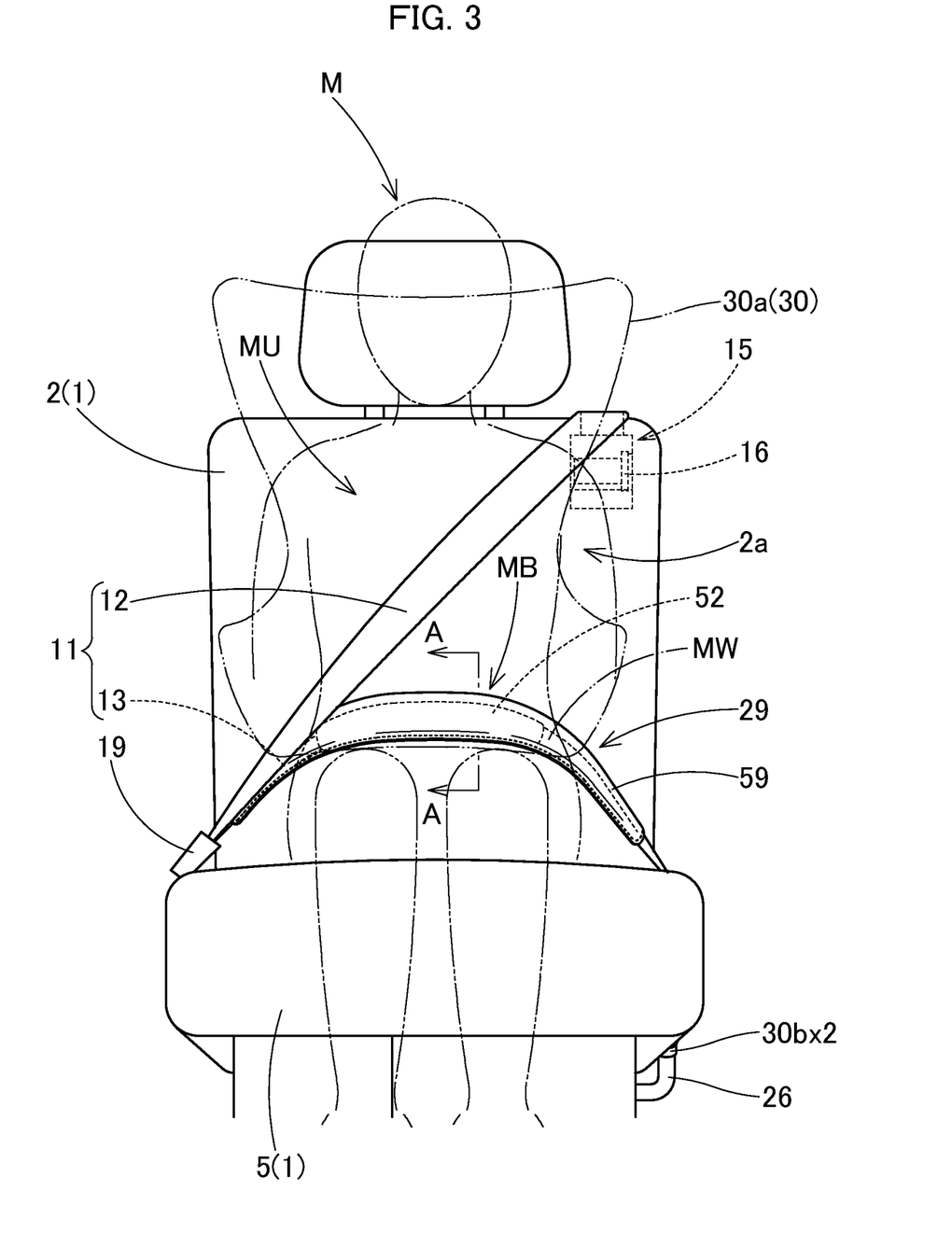
FIG. 3 is a front view of the seat on which the occupant protection device is mounted.
Figure 4:
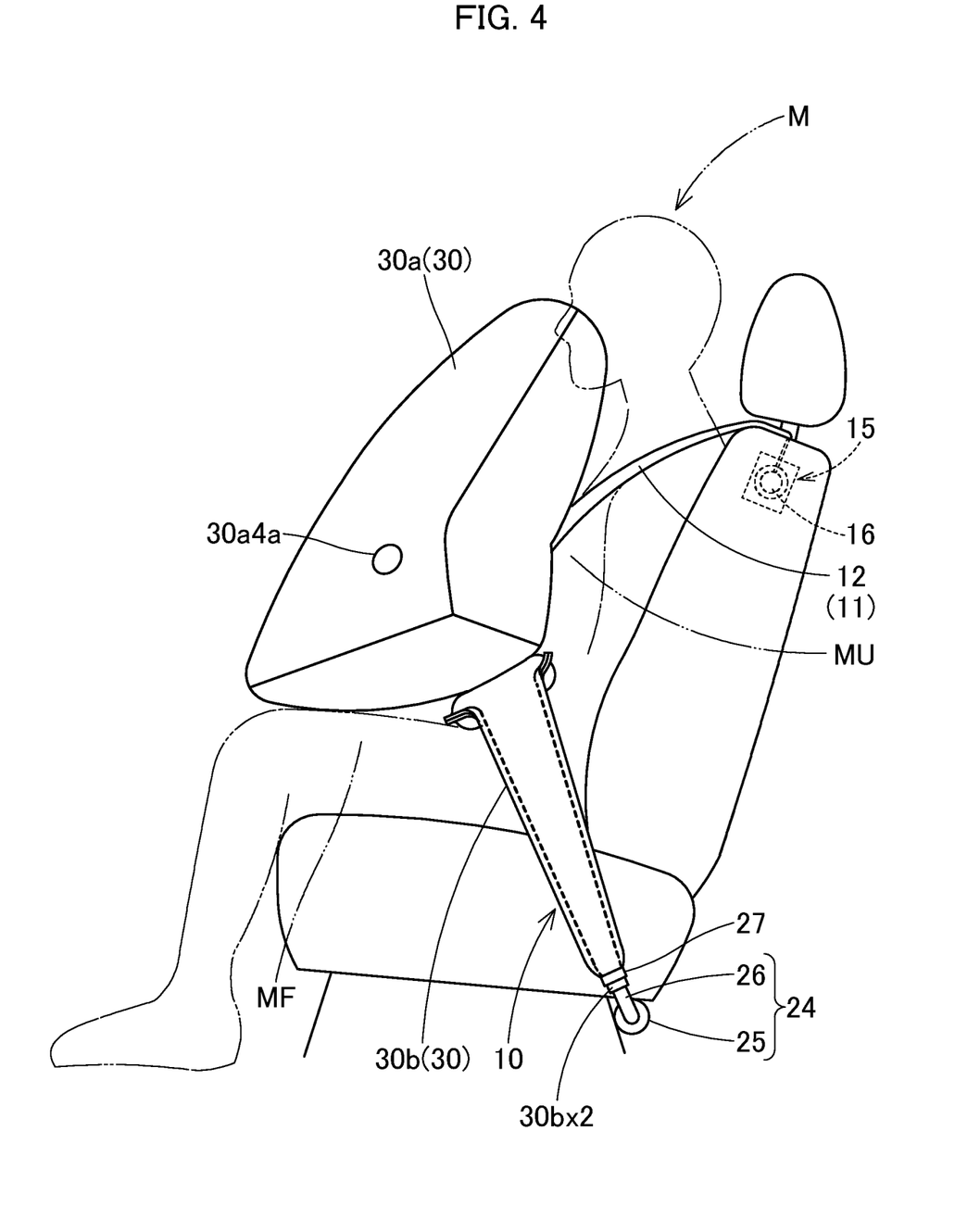
FIG. 4 is a left side view of the seat on which the occupant protection device is mounted.

FIG. 1 is a perspective view of the seat 1 on which the occupant protection device 10 is mounted. FIG. 2 is a left side view of the seat 1 on which the occupant protection device 10 is mounted. FIG. 3 is a front view of the seat 1 on which the occupant protection device 10 is mounted, and shows, as two-dotted chain lines, the occupant M in a state seated on the seat 1 and wearing a seatbelt 11, and an airbag 30 in an inflated state. FIG. 4 is a left side view of the seat 1 on which the occupant protection device 10 is mounted, shows a state wherein the airbag 30 is inflated, and shows, as a two-dotted chain line, the occupant M in a state seated on the seat 1 and wearing the seatbelt 11.

As shown in FIGS. 1 to 4, the occupant protection device is mounted on the seat 1 on a left side of a rear seat of a vehicle, and is provided in order to protect the occupant M seated on the seat 1. The occupant protection device 10 is configured of the seatbelt 11, a bag assembly 29 including the airbag 30, and an inflator 24 that supplies an inflating gas to the airbag 30. The seat 1 includes a backrest portion 2 and a seat portion 5. The occupant protection device 10 can be provided not only on the seat 1 on the left side of the rear seat of the vehicle, but also on another seat in the vehicle.

The seatbelt 11 is formed of a strip-form material wherein a polyester fiber, or the like, with good sliding properties is knitted. The seatbelt 11 is configured in such a way that an upper end 11a side thereof can be fed out from a take-up device (a take-up unit) provided in an interior in a vicinity of a left top edge of the backrest portion 2 in a vicinity of a left shoulder tip of the occupant M seated on the seat 1. A lower end 11b side of the seatbelt 11 forms a fixed end fixed to an anchor member 17 provided on a left side of the seat portion 5. Also, a tongue 20 is provided in an intermediate region of the seatbelt 11. The tongue 20 is fastened to a buckle 19 provided on the right side of the seat portion 5 of the seat 1. A state wherein the occupant M is seated on the seat 1 and the tongue 20 is fastened to the buckle 19 is a state wherein the seatbelt 11 is fastened to the occupant M.

The seatbelt 11 in a state fastened to the occupant M has a shoulder belt portion 12, which is a region that extends from the tongue 20 to the take-up device 15 side, is disposed on a front face side of an upper body MU of the occupant M, and can restrain the upper body MU of the occupant M, and a lap belt portion 13, which is a region that extends from the tongue 20 to the lower end 11b side, is disposed on a front face side of a waist portion MW of the occupant M, and can restrain the waist portion MW. The occupant M can release the fastened state of the tongue 20 with respect to the buckle 19 by carrying out a pressing operation of an unshown release button provided on the buckle 19, and remove the tongue 20 from the buckle 19.

The take-up device 15 has a pretensioner mechanism 16 configured in such a way as to cause the drawing out to stop when there is an abrupt drawing out of the seatbelt 11, and furthermore, in such a way as to be able to take up the drawn out seatbelt 11 when there is a collision or the like of the vehicle. The pretensioner mechanism 16 is a general purpose pretensioner mechanism, and instantaneously takes up the seatbelt 11 by causing a shaft around which the seatbelt 11 is wound to rotate by causing a built-in gas generator to operate.

The inflator 24 is configured of an inflator main body 25, which discharges an inflating gas, and a pipe portion 26 that guides the inflating gas discharged from the inflator main body 25 to the airbag 30. The inflator main body 25 is attached to a seat frame 4 that supports the seat portion 5 of the seat 1. The pipe portion 26 extends from the inflator main body 25, and is of a form bent into an approximate L-shape in such a way as to follow a side face from a bottom face of the seat portion 5.

The bag assembly 29 includes the airbag 30, which is configured of a bag main body portion 30a and a conduit portion 30b, a bag linking portion 52, and a bag cover 59. In a state before the airbag 30 operates, the bag main body portion 30a is housed in an interior of the bag cover 59 in a folded state. The conduit portion 30b of the airbag 30 is connected to the pipe portion 26 of the inflator 24, takes in inflating gas discharged from the inflator 24, and guides the inflating gas to the bag main body portion 30a. A base end portion 30bx2 of the conduit portion 30b of the airbag 30 and the pipe portion 26 of the inflator 24 are linked by being fastened with a clamp 27.

Next, an operation of protecting the occupant M with the occupant protection device 10 will be described. Firstly, on the vehicle colliding, the pretensioner mechanism 16 of the take-up device 15 operates, and the seatbelt 11 fastened to the occupant M is taken up in order to stabilize a seated posture of the occupant M on the seat 1. Because of this, the lap belt portion 13 of the seatbelt 11 is drawn to the tongue 20 side, and the shoulder belt portion 12 continuing from the lap belt portion 13 is drawn to the shoulder tip side of the occupant M. Subsequently, the inflator 24 operates, and on inflating gas being supplied from the inflator main body 25 via the pipe portion 26 and the conduit portion 30b of the airbag 30 to the bag main body portion 30a of the airbag 30, the bag main body portion 30a inflates. Because of this, the upper body MU of the occupant M, who is moving forward, is received by the bag main body portion 30a, whereby the occupant M is protected.

Figure 5:
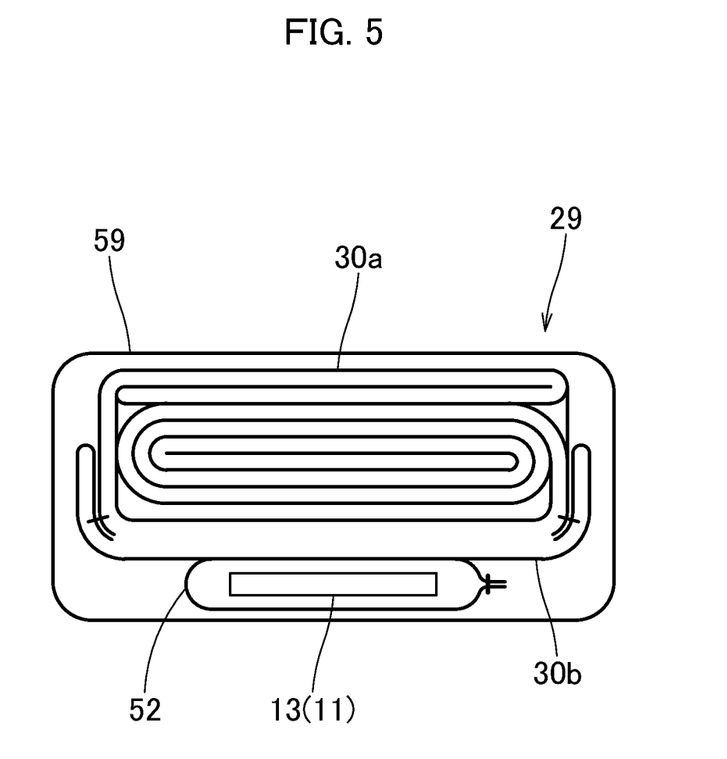
FIG. 5 is a sectional view of a bag assembly cut along an A-A portion shown in FIG. 3.
Figure 6:
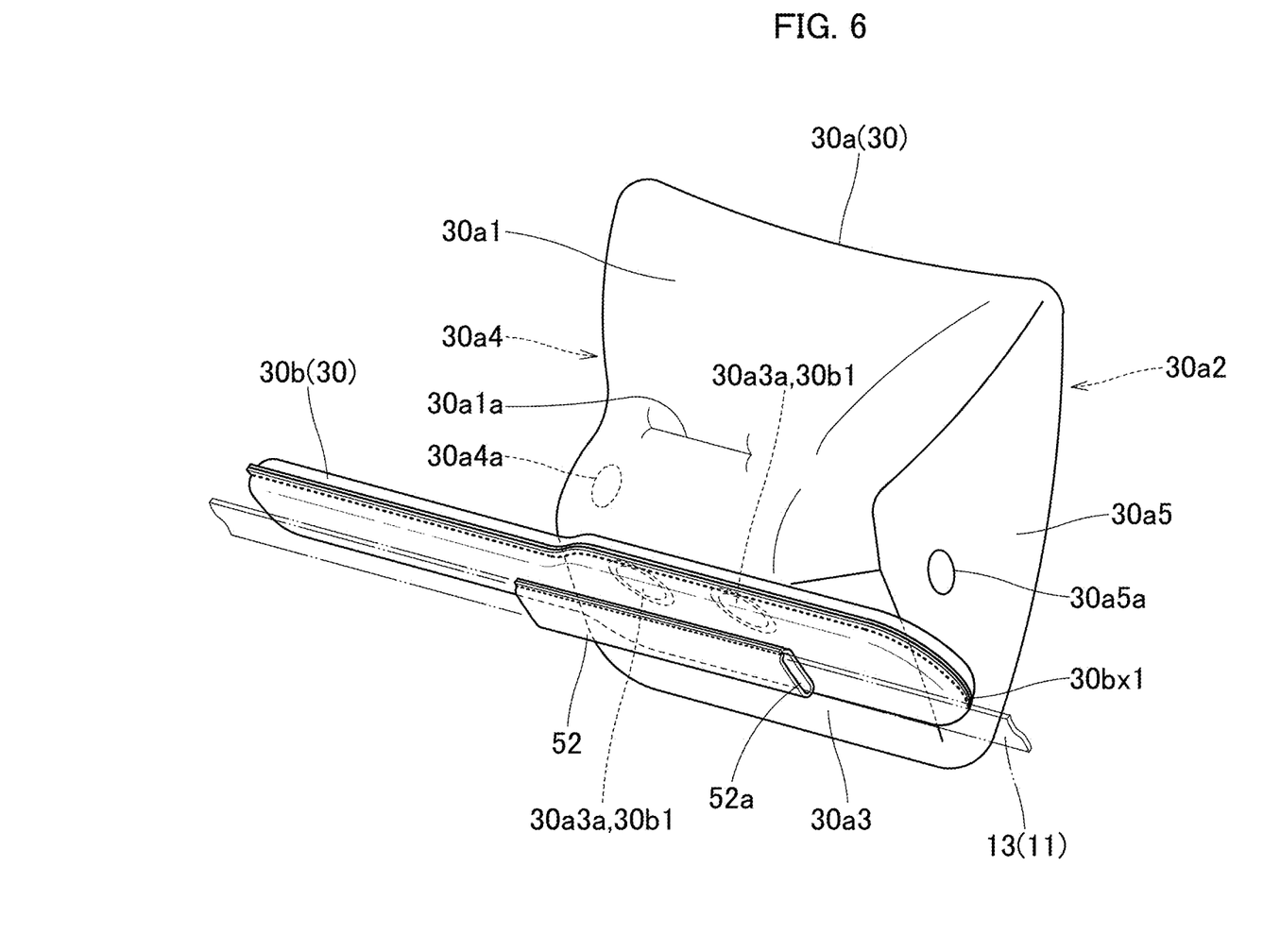
FIG. 6 is a perspective view wherein the bag assembly in a state wherein an airbag is inflated is seen from below.
Figure 7:
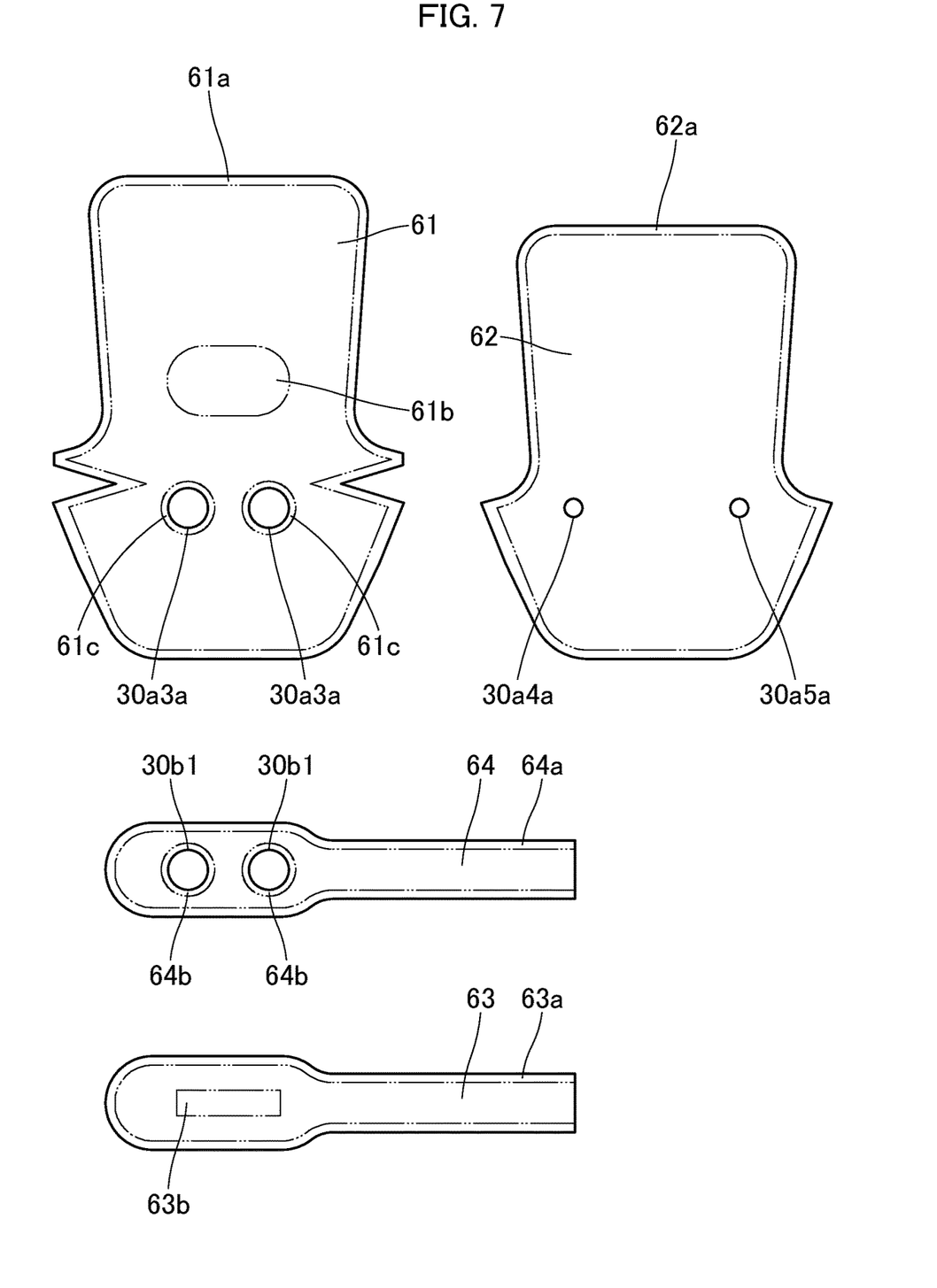
FIG. 7 is an exploded plan view of a bag main body portion and a conduit portion configuring the airbag.

Next, a configuration of the bag assembly 29 will be described. FIG. 5 is a sectional view of the bag assembly 29 cut along an A-A portion shown in FIG. 3. FIG. 6 is a perspective view wherein the bag assembly 29 in a state wherein the airbag is inflated is seen from below, with the bag cover 59 being omitted. FIG. 7 is an exploded plan view of the bag main body portion 30a and the conduit portion 30b configuring the airbag 30. As shown in FIGS. 5 to 7, the bag assembly 29 includes the airbag 30, the bag linking portion 52, and the bag cover 59.

The airbag 30 is configured of the bag main body portion 30a, which acts as a main body portion that receives the occupant M by inflating owing to inflating gas, and the conduit portion 30b, which is connected to the pipe portion 26 of the inflator 24, and causes inflating gas to flow into the bag main body portion 30a by guiding the inflating gas discharged from the inflator 24 to an inflow port 30a3a of the bag main body portion 30a. The bag main body portion 30a and the conduit portion 30b are linked by being sewn together.

The bag main body portion 30a when inflation is completed has a back wall portion 30a1, which is disposed on the occupant M side and receives the upper body MU of the occupant M, who moves forward, a front wall portion 30a2 disposed on a front side opposite to the occupant M side, a lower wall portion 30a3, which is disposed on a lower side and is supported by a thigh portion MF of the occupant M, and a left wall portion 30a4 and a right wall portion 30a5 disposed on a left and right respectively. Also, a bending stitched portion 30a1a for causing an upper portion of the back wall portion 30a1 to bend in such a way as to approach the occupant M side when inflation of the bag main body portion 30a is completed is provided in an up-down direction intermediate portion of the back wall portion 30a1 of the bag main body portion 30a.

Two inflow ports 30a3a, which are aperture portions for causing inflating gas inside the conduit portion 30b to flow in, are provided in the lower wall portion 30a3 of the bag main body portion 30*a*. Furthermore, ventholes 30*a*4*a* and 30*a*5*a*, which are aperture portions for discharging excess inflating gas that has flowed into the bag main body portion 30*a*, are provided in the left wall portion 30*a*4 and the right wall portion 30*a*5 of the bag main body portion 30*a*.

The bag main body portion 30*a* is formed by sewing together edge portions 61*a* and 62*a* of a back side member 61 and a front side member 62 formed of a bag base fabric, which is a woven fabric formed by plain weaving, or the like, a polyester fiber. The back side member 61 forms a back portion side of the back wall portion 30*a*1, the lower wall portion 30*a*3, and the left wall portion 30*a*4, and a back portion side of the right wall portion 30*a*5. The front side member 62 forms a front portion side of the front wall portion 30*a*2 and the left wall portion 30*a*4, and a front portion side of the right wall portion 30*a*5. Also, the bending stitched portion 30*a*1*a* of the back wall portion 30*a*1 is formed by an approximately elliptical portion to be stitched 61*b* of the back side member 61 being pinched and folded in two, and coinciding portions being sewn together.

The conduit portion 30*b* is a tubular member that is linked to each of the pipe portion 26 of the inflator 24 and the bag main body portion 30*a*, and extends in a longitudinal direction of the lap belt portion 13. The conduit portion 30*b* has a communication port 30*b*1 that communicates with the inflow port 30*a*3*a* of the bag main body portion 30*a*. In order to secure a diameter of the communication port 30*b*1, a front-back direction width on a leading end portion 30*bx*1 side of the conduit portion 30*b* is greater than a width on a base end portion 30*bx*2 side. Inflating gas in an interior of the conduit portion 30*b* flows via the communication port 30*b*1 and the inflow port 30*a*3*a* into an interior of the bag main body portion 30*a*.

The conduit portion 30 is formed by sewing together edge portions 63*a* and 64*a* of a lower side member 63 and an upper side member 64 formed of a bag base fabric that is a material the same as the material of the bag main body portion 30*a*. The lower side member 63 is linked to the bag linking portion 52 by being sewn to the bag linking portion 52 in a stitching portion 63*b*. The upper side member 64 is linked to the lower wall portion 30*a*3 of the bag main body portion 30*a* by a peripheral edge 64*b* of the communication port 30*b*1 being sewn to a peripheral edge 61*c* of the inflow port 30*a*3*a* of the back side member 61 forming the bag main body portion 30*a*. External dimensions of the lower side member 63 and the upper side member 64 are the same.

The bag linking portion 52 is a tubular member formed of a material the same as the bag base fabric forming the airbag 30, and is a member that links the airbag 30 to the lap belt portion 13. A space in a tubular interior of the bag linking portion 52 forms a belt insertion portion 52*a* through which the lap belt portion 13 is inserted. After the lap belt portion 13 is inserted through the belt insertion portion 52*a*, the bag linking portion 52 and the lap belt portion 13 are linked by the two being sewn together. An upper face of the bag linking portion 52 is linked by sewing to the stitched portion 63*b* of the lower side member 63 forming the conduit portion 30*b* of the airbag 30.

The bag cover 59 is a tubular member formed of a kind of fabric used as a material of the seat 1. The bag cover 59 houses the bag main body portion 30*a* of the airbag 30 in a state folded in an interior of the tube, one portion of the conduit portion 30*b*, the bag linking portion 52, and a portion of the lap belt portion 13 installed in the bag assembly 29. The bag cover 59 is subjected to pressure from the bag main body portion 30*a* when the bag main body portion 30*a* of the airbag 30 inflates, and one portion thereof ruptures, causing the bag main body portion 30*a* to protrude from the bag cover 59.

Figure 8:
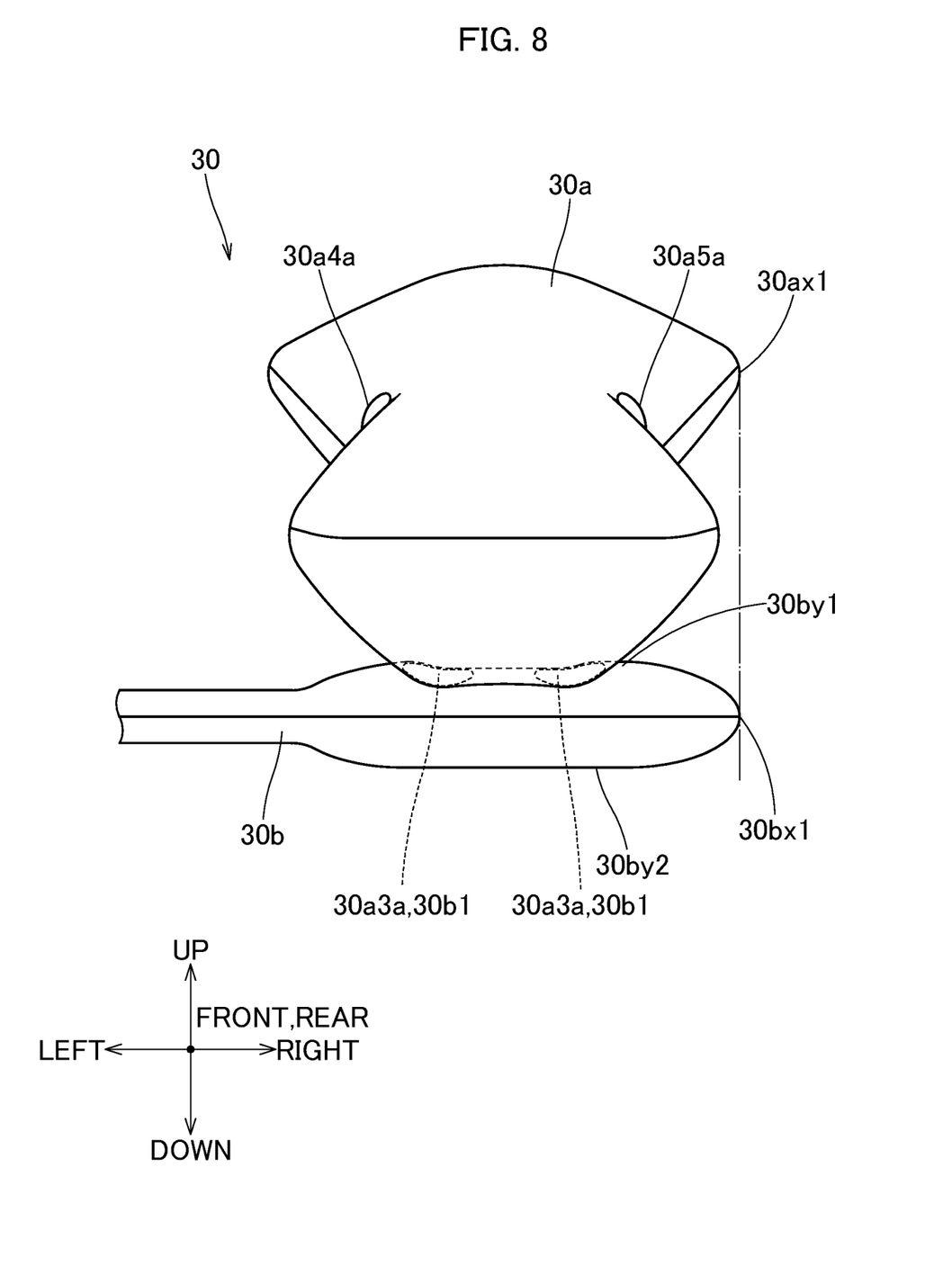
FIG. 8 is a drawing wherein the bag main body portion and the conduit portion when inflation of the airbag is completed are seen from behind.

FIG. 8 is a drawing wherein the bag main body portion 30*a* and the conduit portion 30*b* when inflation of the airbag 30 is completed are seen from behind (the occupant M side). In a state wherein the bag main body portion 30*a* of the airbag 30 is inflated, as shown in FIG. 8, the leading end portion 30*bx*1 of the conduit portion 30*b*, which is an end portion on the tongue 20 side of the conduit portion 30*b* in a left-right direction, extends as far as a position equivalent to that of a leading end portion 30*ax*1 of the bag main body portion 30*a*, which is an end portion on the tongue 20 side of the bag main body portion 30*a*. The seat 1 of the present embodiment is a seat on the left side of the rear seat of the vehicle, and the take-up device 15 and the anchor member 17 are also disposed on the left side. Because of this, the leading end portion 30*ax*1 of the bag main body portion 30*a* is an end portion on a vehicle interior side of the bag main body portion 30*a* in the left-right direction, and is also a right end portion. In the same way, the leading end portion 30*bx*1 of the conduit portion 30*b* is an end portion on the vehicle interior side of the conduit portion 30*b* in the left-right direction, and is also a right end portion. Also, the leading end portion 30*bx*1 of the conduit portion 30*b* is also an end portion on a side opposite to an end portion on the side connected to the inflator 24. Further, the leading end portion 30*ax*1 of the bag main body portion 30*a* and the leading end portion 30*bx*1 of the conduit portion 30*b* are positioned in equivalent positions in the left-right direction. In addition to the positions of the leading end portion 30*ax*1 of the bag main body portion 30*a* and the leading end portion 30*bx*1 of the conduit portion 30*b* in the left-right direction being of exactly the same configuration, configurations deviating within a tolerance range are included in equivalent positions in this case.

By setting a positional relationship between the leading end portion 30*ax*1 of the bag main body portion 30*a* and the leading end portion 30*bx*1 of the conduit portion 30*b* in this way, the following advantages are obtained. That is, it is necessary to cause an upper face 30*by*1 and a bottom face 30*by*2 to be linked in the leading end portion 30*bx*1 of the conduit portion 30*b*, meaning that the leading end portion 30*bx*1 side gradually narrows, and a vertical direction width decreases. This means that when the leading end portion 30*bx*1 of the conduit portion 30*b* is positioned in a position (on a vehicle exterior side, the anchor member 17 side) farther than the leading end portion 30*ax*1 of the bag main body portion 30*a* from the tongue 20 in the left-right direction, a narrowing starting point on the leading end portion 30*bx*1 side of the conduit portion 30*b* is liable to be positioned in a region in which the bag main body portion 30*a* in an inflated state and the conduit portion 30*b* are in contact, because of which there is concern that the leading end portion 30*ax*1 side of the bag main body portion 30*a* will drop downward following a form of the leading end portion 30*bx*1 side of the conduit portion 30*b*, and the bag main body portion 30*a* will incline.

In response to this, by disposing the leading end portion 30*bx*1 of the conduit portion 30*b* as heretofore described, the position of the narrowing starting point on the leading end portion 30*bx*1 side of the conduit portion 30*b* is easily shifted to a non-contact region farther to the tongue 20 side than the region in which the bag main body portion 30*a* and the conduit portion 30*b* are in contact. Because of this, the bag main body portion 30*a* in an inflated state is unlikely to drop downward following the form of the leading end portion 30*bx*1 side of the conduit portion 30*b*, and the leading end portion 30*ax*1 side of the bag main body portion 30*a* inclining downward can be restricted. This means that when the occupant M is received by the bag main body portion 30*a*, the bag main body portion 30*a* easily receives the occupant M in a vicinity of a center of the bag main body portion 30*a*, and safety of the occupant M is more easily secured.

For the aforementioned reasons, the position of the narrowing starting point on the leading end portion 30*bx*1 side of the conduit portion 30*b* is preferably positioned in a non-contact region farther to the tongue 20 side than the region in which the bag main body portion 30*a* in an inflated state and the conduit portion 30*b* are in contact. Even when the narrowing starting point is positioned within the contact region, however, the configuration of the present embodiment is such that the position of the narrowing starting point on the leading end portion 30*bx*1 side of the conduit portion 30*b* can be shifted to the tongue 20 side more easily in comparison with a configuration wherein the leading end portion 30*bx*1 of the conduit portion 30*b* is disposed in a position farther than the leading end portion 30*ax*1 of the bag main body portion 30*a* from the tongue 20, because of which an advantage can be obtained in that the leading end portion 30*ax*1 side of the bag main body portion 30*a* inclining downward is restricted.

Figure 9:
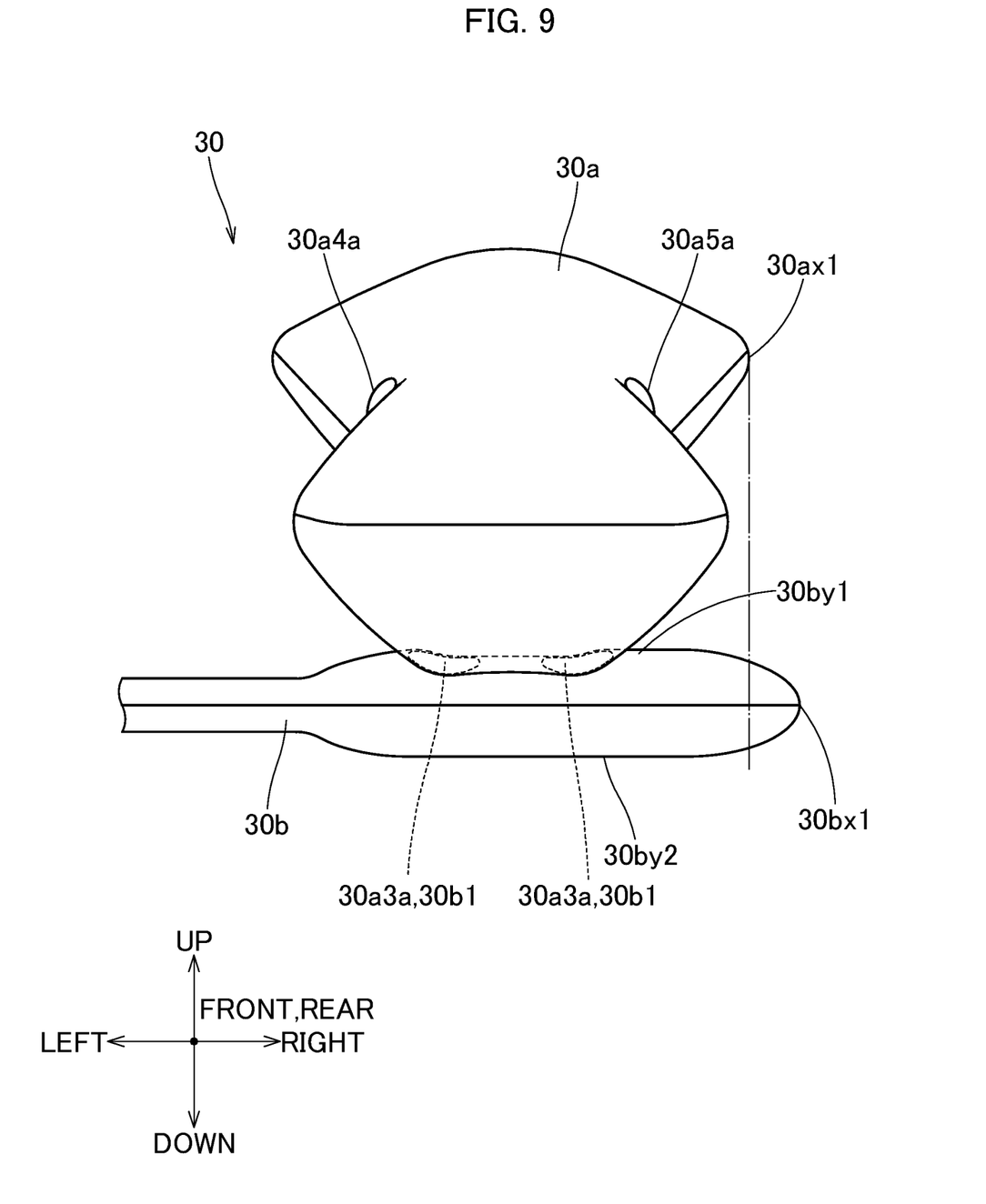
FIG. 9 is a drawing wherein the bag main body portion and the conduit portion when inflation of the airbag is completed are seen from behind.

Also, a configuration wherein the left-right direction leading end portion 30*bx*1 of the conduit portion 30*b* extends to a position nearer than the leading end portion 30*ax*1 of the bag main body portion 30*a* to the tongue 20 in a state wherein the bag main body portion 30*a* is inflated, as shown in FIG. 9, may be adopted. By so doing, the position of the narrowing starting point on the leading end portion 30*bx*1 side of the conduit portion 30*b* is still more easily shifted to a region in which the bag main body portion 30*a* and the conduit portion 30*b* are not in contact, and the leading end portion 30*ax*1 side of the bag main body portion 30*a* inclining downward is still more easily restricted.

Second Embodiment

Next, the occupant protection device 10 according to a second embodiment of the invention will be described. With regard to portions whose description duplicates that of the first embodiment, the same drawings and the same reference signs are allotted, and a description thereof is omitted.

Figure 10:
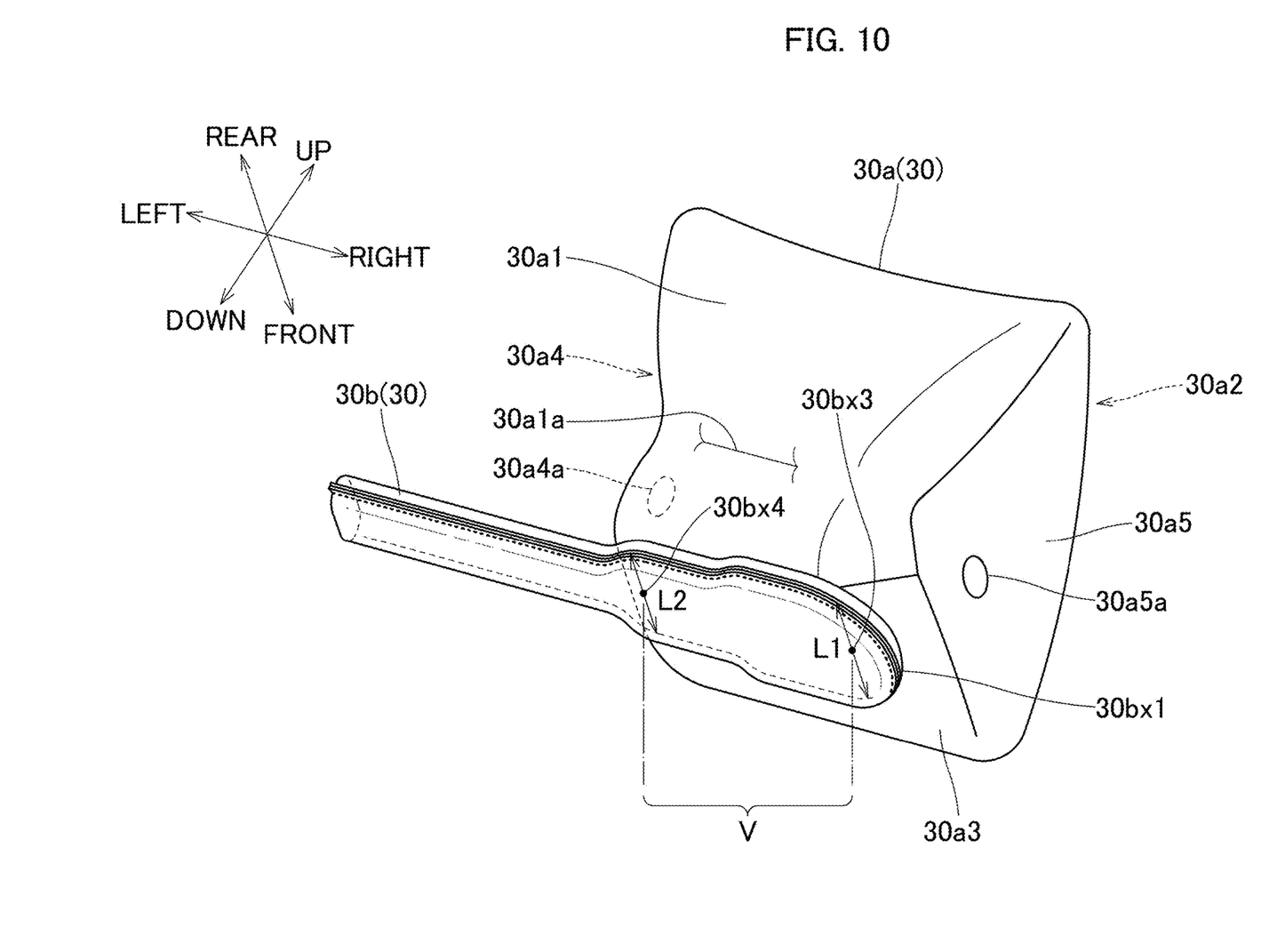
FIG. 10 is a perspective view wherein the bag main body portion and the conduit portion when inflation of the airbag in the occupant protection device according to a second embodiment of the invention is completed is seen from below.

The occupant protection device 10 according to the present embodiment differs from the configuration of the first embodiment only in the form of the conduit portion 30*b* of the airbag 30, while other configurations are the same as the configurations of the first embodiment. FIG. 10 is a perspective view wherein the bag main body portion 30*a* and the conduit portion 30*b* when inflation of the airbag 30 in the occupant protection device 10 according to the present embodiment is completed is seen from below. As shown in FIG. 10, a region in which the conduit portion 30*b* and the bag main body portion 30*a* are in contact in a state wherein the bag main body portion 30*a* is inflated is a contact region V. At this time, the conduit portion 30*b* of the airbag 30 according to the present embodiment is such that an end portion 30*bx*3 on the tongue 20 side of the conduit portion 30*b* in the contact region V in the left-right direction is of a form whose front-back direction width is greater than that of an end portion 30*bx*4 on the inflator 24 side in the contact region V. That is, a front-back direction width L1 of the end portion 30*bx*3 on the tongue 20 side of the conduit portion 30*b* in the contact region V is wider than a front-back direction width L2 of the end portion 30*bx*4 on the inflator 24 side in the contact region V. Front-back direction width of the conduit portion 30*b* in this case has the end portions 30*bx*3 and 30*bx*4 of the conduit portion 30*b* in the contact region V as references, means front-back direction width of the conduit portion 30*b* in these positions, and rather than meaning a front-back direction width in the relevant position of a portion in which the conduit portion 30*b* and the bag main body portion 30*a* are in contact, means a width wherein the width of the contact portion and a width of a non-contact portion are combined.

The conduit portion 30*b* of the airbag 30 is such that not only the left-right direction leading end portion 30*bx*1, but also the upper face 30*by*1 and the bottom face 30*by*2 need to be linked at both front-back direction end portions. Because of this, one end side and an other end side in the front-back direction gradually narrow, and a vertical direction width decreases, in the same way as on the leading end portion 30*bx*1 side of the conduit portion 30*b*. Herein, as the contact region V extends to the leading end portion 30*bx*1 side of the conduit portion 30*b*, the end portion 30*bx*4 on the inflator 24 side of the conduit portion 30*b* in the contact region V is in a position distanced from a narrowing starting point on the leading end portion 30*bx*1 side, meaning that although the one end side and the other end side in the front-back direction gradually narrow, the vertical direction width is unlikely to decrease.

Also, according to the configuration of the present embodiment, the front-back direction width L1 of the end portion 30*bx*3 on the tongue 20 side of the conduit portion 30*b* in the contact region V is wider than the front-back direction width L2 of the end portion 30*bx*4 on the inflator 24 side in the contact region V in a state wherein the bag main body portion 30*a* is inflated. This means that even when the end portion 30*bx*3 on the tongue 20 side of the conduit portion 30*b* in the contact region V is positioned in a vicinity of the narrowing starting point on the leading end portion 30*bx*1 side of the conduit portion 30*b*, the narrowing starting point of the one end side and the other end side in the front-back direction in the end portion 30*bx*3 of the conduit portion 30*b* can easily be shifted to outside the contact region V, and the vertical direction width of the end portion 30*bx*3 of the conduit portion 30*b* is easily maintained wide at both end portions in the front-back direction. Consequently, the bag main body portion 30*a* in an inflated state is unlikely to drop downward following the form of the leading end portion 30*bx*1 side of the conduit portion 30*b*, and the leading end portion 30*ax*1 side of the bag main body portion 30*a* inclining downward can be restricted.

The position of the narrowing starting point in the front-back direction of the leading end portion 30*bx*3 on the tongue 20 side of the conduit portion 30*b* in the contact region V is preferably positioned on an outer side of the contact region V. Even when the narrowing starting point is positioned on an inner side of the contact region V, however, the configuration of the present embodiment is such that the position of the narrowing starting point in the front-back direction of the end portion 30*bx*3 of the conduit portion 30*b* can be shifted from a central side of the contact region V to an outer side more easily in comparison with a configuration wherein the front-back direction width L1 of the end portion 30*bx*3 of the conduit portion 30*b* in the contact region V is equal to or less than the front-back direction width L2 of the end portion 30*bx*4, because of which an advantage can be obtained in that the leading end portion 30*ax*1 side of the bag main body portion 30*a* inclining downward is restricted.

Also, although a configuration wherein the leading end portion 30bx1 of the conduit portion 30b in the left-right direction in a state wherein the bag main body portion 30a is inflated is positioned farther than the leading end portion 30ax1 of the bag main body portion 30a to the inflator 24 side is described in the present embodiment, the invention is not limited to this. That is, a configuration wherein the leading end portion 30bx1 of the conduit portion 30b extends as far as a position equivalent to that of the leading end portion 30ax1 of the bag main body portion 30a in the left-right direction, in the same way as in the configuration of the first embodiment, or a configuration wherein the leading end portion 30bx1 of the conduit portion 30b extends farther than the leading end portion 30ax1 of the bag main body portion 30a to the tongue 20 side, may be adopted. According to these kinds of configuration, the position of the narrowing starting point on the leading end portion 30bx1 side is easily shifted to the outer side of the contact region V, and the leading end portion 30ax1 side of the bag main body portion 30a inclining downward can be further restricted.

Also, although the occupant protection device 10 is described with the so-called three-point seatbelt 11, wherein the seatbelt 11 includes the shoulder belt portion 12 and the lap belt portion 13, as an example in the first embodiment and the second embodiment, the invention is not limited to this. That is, even when the invention is applied to the so-called two-point seatbelt 11, wherein the seatbelt 11 includes the lap belt portion 13 without including the shoulder belt portion 12, advantages the same as those heretofore described can be obtained.

What is claimed is:

1. An occupant protection device for protecting an occupant seated in a seat, the occupant protection device comprising:
    a seatbelt having at least a tongue, a buckle to which the tongue is joined, and a lap belt portion that is adapted and configured to restrain a waist portion of the occupant seated in the seat in a state where the tongue is joined to the buckle;
    an inflator that discharges an inflating gas; and
    an airbag that is provided in the lap belt portion, the airbag including a main body portion, which is adapted and configured to receive the occupant by inflating owing to the inflating gas being supplied, and a conduit portion, which is connected to the inflator, extends along the lap belt portion, and causes the inflating gas to flow into the main body portion by guiding the inflating gas discharged from the inflator to an inflow port of the main body portion,
    wherein an end portion on the tongue side of the conduit portion in a left-right direction of the seat in a state where the main body portion is inflated extends as far as a position equivalent to that of an end portion on the tongue side of the main body portion, or nearer than the end portion on the tongue side of the main body portion to the tongue.

2. The occupant protection device according to claim 1,
    wherein in a state where the main body portion is inflated, the conduit portion narrows in such a way that a width in a vertical direction decreases from a narrowing starting point toward the end portion on the tongue side, the narrowing starting point being disposed in a position nearer than a contact region in which the conduit portion and the main body portion are in contact to the end portion on the tongue side of the conduit portion.

3. The occupant protection device according to claim 1, further comprising a take-up unit that can take up the seatbelt,
    wherein the inflator and the take-up unit are mounted in the seat.

4. An occupant protection device for protecting an occupant seated in a seat, the occupant protection device comprising:
    a seatbelt having at least a tongue, a buckle to which the tongue is joined, and a lap belt portion that is adapted and configured to restrain a waist portion of the occupant seated in the seat in a state where the tongue is joined to the buckle;
    an inflator that discharges an inflating gas; and
    an airbag that is provided in the lap belt portion, the airbag including a main body portion, which is adapted and configured to receive the occupant by inflating owing to the inflating gas being supplied, and a conduit portion, which is connected to the inflator, extends along the lap belt portion, and causes the inflating gas to flow into the main body portion by guiding the inflating gas discharged from the inflator to an inflow port of the main body portion,
    wherein an end portion on the tongue side of the conduit portion in a left-right direction of the seat in a contact region in which the conduit portion and the main body portion are in contact in a state where the main body portion is inflated is of a form such that a width in a front-back direction of the seat is greater than that of an end portion on the inflator side in the left-right direction of the conduit portion in the contact region.

5. The occupant protection device according to claim 4, further comprising a take-up unit that can take up the seatbelt,
    wherein the inflator and the take-up unit are mounted in the seat.

* * * * *